US012641411B2

(12) United States Patent
Mendoza et al.

(10) Patent No.: US 12,641,411 B2
(45) Date of Patent: May 26, 2026

(54) MONITORING BANDWIDTH UTILIZATION ON AN INTERNATIONAL MOBILE SUBSCRIBER IDENTITY (IMSI) BASIS

(71) Applicants: AT&T Intellectual Property I, L.P., Atlanta, GA (US); AT&T Mobility II LLC, Atlanta, GA (US)

(72) Inventors: Omar F. Mendoza, Marietta, GA (US); Ross Joswick, Easton, PA (US); Erin Krempecki, East Brunswick, NJ (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 300 days.

(21) Appl. No.: 18/488,437

(22) Filed: Oct. 17, 2023

(65) Prior Publication Data

US 2025/0126458 A1      Apr. 17, 2025

(51) Int. Cl.
*H04W 8/18* (2009.01)
*H04L 41/22* (2022.01)

(52) U.S. Cl.
CPC ............... *H04W 8/18* (2013.01); *H04L 41/22* (2013.01)

(58) Field of Classification Search
CPC ........... H04W 8/18; H04W 8/20; H04W 8/22; H04L 41/22

USPC .............. 455/405, 2.01, 403; 379/111; 725/9
See application file for complete search history.

(56) References Cited

U.S. PATENT DOCUMENTS

| | | | |
|---|---|---|---|
| 11,683,740 B2 * | 6/2023 | Zheng | H04L 41/0895 |
| | | | 455/452.1 |
| 2010/0075668 A1 * | 3/2010 | Pan | H04W 8/06 |
| | | | 455/433 |
| 2020/0068473 A1 * | 2/2020 | Tang | H04W 36/322 |
| 2021/0368379 A1 * | 11/2021 | Xing | H04L 41/5067 |
| 2023/0209491 A1 * | 6/2023 | Zhang | H04W 60/04 |
| | | | 455/435.1 |

* cited by examiner

*Primary Examiner* — Juan A Torres
(74) *Attorney, Agent, or Firm* — Guntin & Gust, PLC; Miyoung Shin

(57) ABSTRACT

A method may include receiving a first data set related to a first International Mobile Subscriber Identifier (IMSI) from a wireless core system, tidying the first data set by building a bandwidth matrix representing each bandwidth usage value with respect to a selected time-stamp and one or more flow IDs associated with the first IMSI, repeating the receiving and tidying operations with respect to a plurality of data sets related to remaining IMSIs, and generating data visualization displaying the bandwidth usage value of the first IMSI and the remaining IMSIs. The first IMSI and the remaining IMSIs are associated with a selected network slice ID.

20 Claims, 14 Drawing Sheets

100

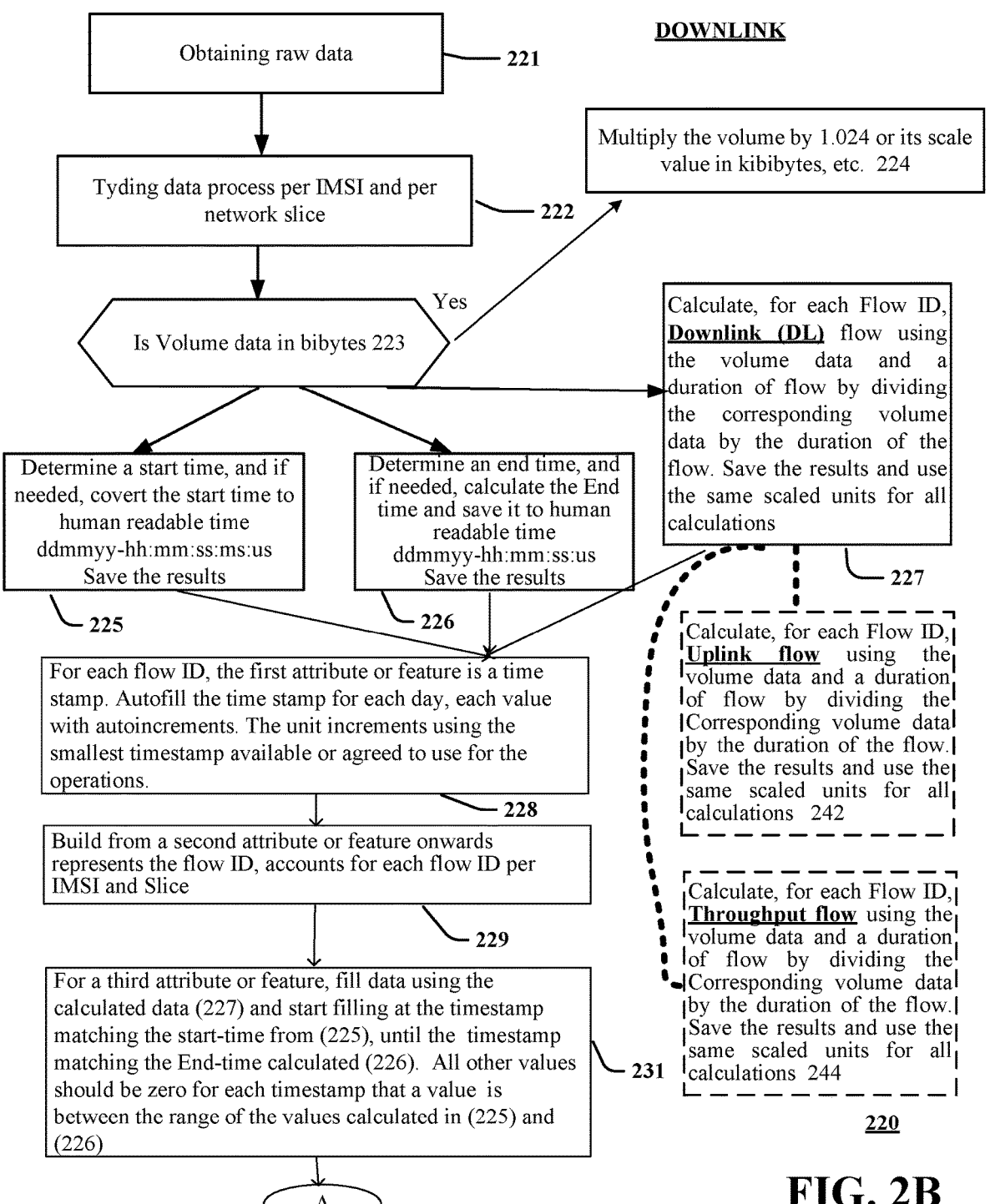

DOWNLINK

Obtaining raw data — 221

Tyding data process per IMSI and per network slice — 222

Is Volume data in bibytes 223

Yes

Multiply the volume by 1.024 or its scale value in kibibytes, etc. 224

Determine a start time, and if needed, covert the start time to human readable time ddmmyy-hh:mm:ss:ms:us Save the results — 225

Determine an end time, and if needed, calculate the End time and save it to human readable time ddmmyy-hh:mm:ss:us Save the results — 226

Calculate, for each Flow ID, Downlink (DL) flow using the volume data and a duration of flow by dividing the corresponding volume data by the duration of the flow. Save the results and use the same scaled units for all calculations — 227

For each flow ID, the first attribute or feature is a time stamp. Autofill the time stamp for each day, each value with autoincrements. The unit increments using the smallest timestamp available or agreed to use for the operations. — 228

Calculate, for each Flow ID, Uplink flow using the volume data and a duration of flow by dividing the Corresponding volume data by the duration of the flow. Save the results and use the same scaled units for all calculations 242

Build from a second attribute or feature onwards represents the flow ID, accounts for each flow ID per IMSI and Slice — 229

For a third attribute or feature, fill data using the calculated data (227) and start filling at the timestamp matching the start-time from (225), until the timestamp matching the End-time calculated (226). All other values should be zero for each timestamp that a value is between the range of the values calculated in (225) and (226) — 231

Calculate, for each Flow ID, Throughput flow using the volume data and a duration of flow by dividing the Corresponding volume data by the duration of the flow. Save the results and use the same scaled units for all calculations 244

Figure 2D:
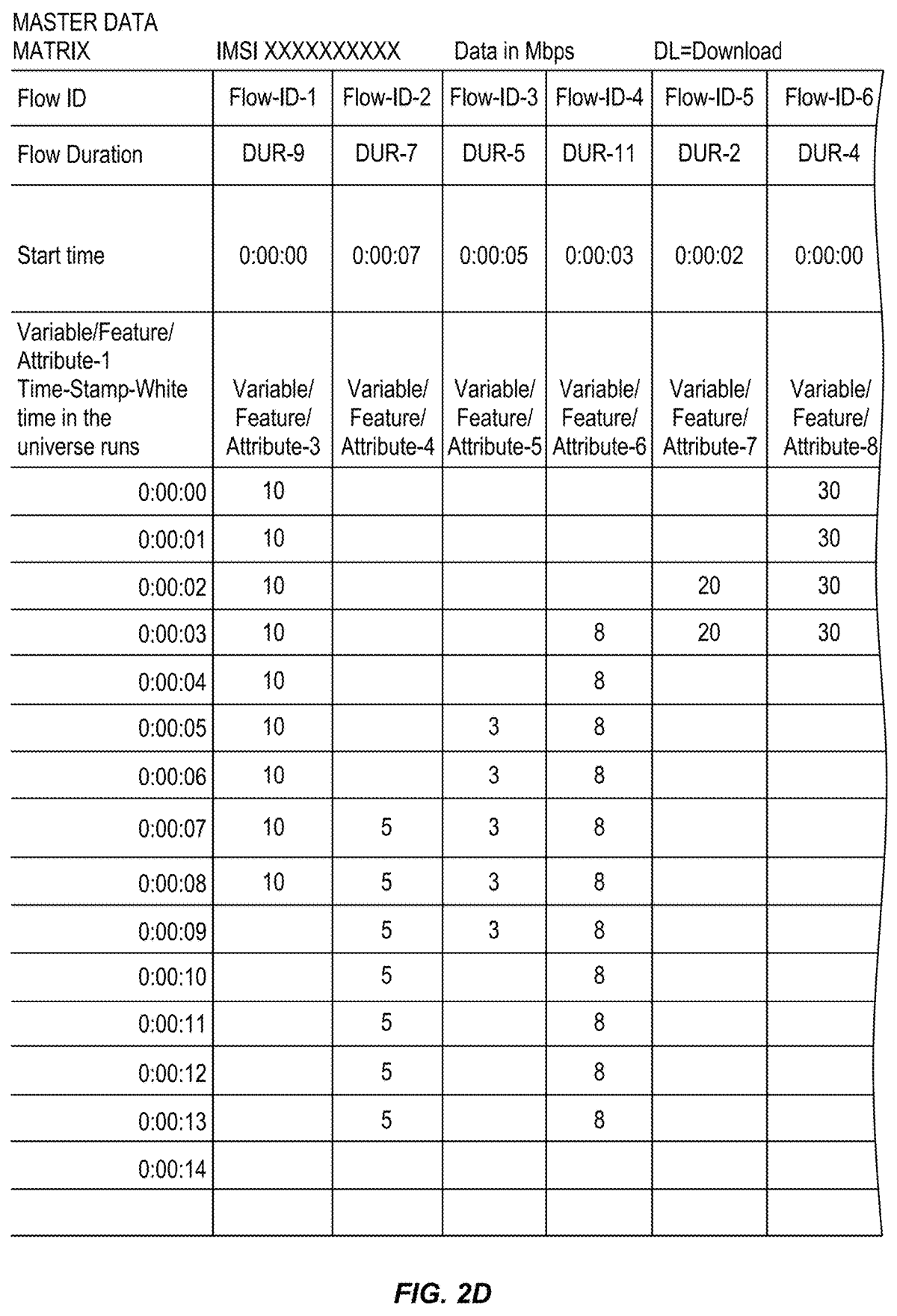

| MASTER DATA MATRIX | IMSI XXXXXXXXXX | Data in Mbps | | DL=Download | | |
|---|---|---|---|---|---|---|
| Flow ID | Flow-ID-1 | Flow-ID-2 | Flow-ID-3 | Flow-ID-4 | Flow-ID-5 | Flow-ID-6 |
| Flow Duration | DUR-9 | DUR-7 | DUR-5 | DUR-11 | DUR-2 | DUR-4 |
| Start time | 0:00:00 | 0:00:07 | 0:00:05 | 0:00:03 | 0:00:02 | 0:00:00 |
| Variable/Feature/Attribute-1 Time-Stamp-White time in the universe runs | Variable/ Feature/ Attribute-3 | Variable/ Feature/ Attribute-4 | Variable/ Feature/ Attribute-5 | Variable/ Feature/ Attribute-6 | Variable/ Feature/ Attribute-7 | Variable/ Feature/ Attribute-8 |
| 0:00:00 | 10 | | | | | 30 |
| 0:00:01 | 10 | | | | | 30 |
| 0:00:02 | 10 | | | | 20 | 30 |
| 0:00:03 | 10 | | | 8 | 20 | 30 |
| 0:00:04 | 10 | | | 8 | | |
| 0:00:05 | 10 | | 3 | 8 | | |
| 0:00:06 | 10 | | 3 | 8 | | |
| 0:00:07 | 10 | 5 | 3 | 8 | | |
| 0:00:08 | 10 | 5 | 3 | 8 | | |
| 0:00:09 | | 5 | 3 | 8 | | |
| 0:00:10 | | 5 | | 8 | | |
| 0:00:11 | | 5 | | 8 | | |
| 0:00:12 | | 5 | | 8 | | |
| 0:00:13 | | 5 | | 8 | | |
| 0:00:14 | | | | | | |
| | | | | | | |

Figure 2D:
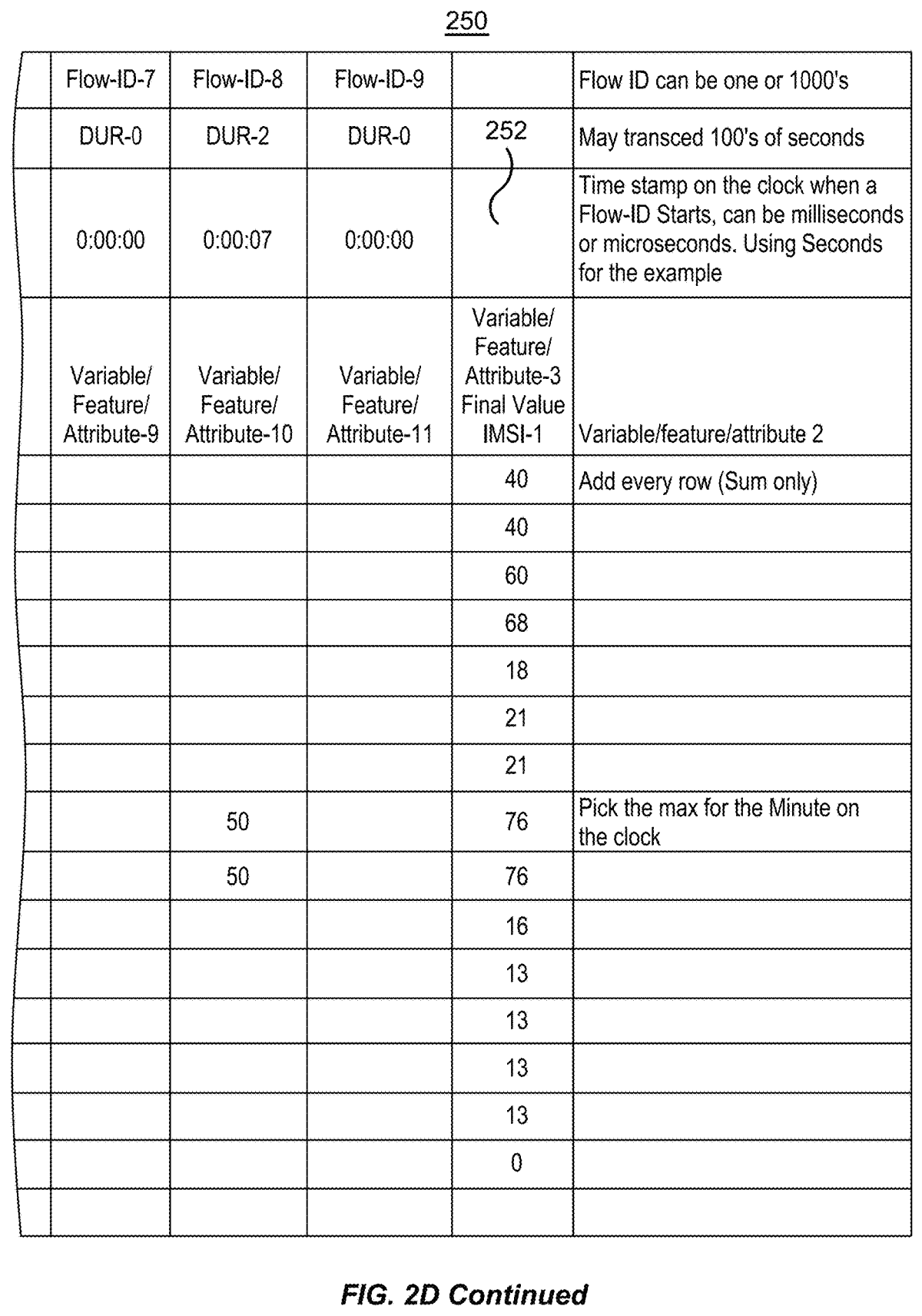

| | Flow-ID-7 | Flow-ID-8 | Flow-ID-9 | | Flow ID can be one or 1000's |
|---|---|---|---|---|---|
| | DUR-0 | DUR-2 | DUR-0 | 252 | May transced 100's of seconds |
| | 0:00:00 | 0:00:07 | 0:00:00 | | Time stamp on the clock when a Flow-ID Starts, can be milliseconds or microseconds. Using Seconds for the example |
| | Variable/ Feature/ Attribute-9 | Variable/ Feature/ Attribute-10 | Variable/ Feature/ Attribute-11 | Variable/ Feature/ Attribute-3 Final Value IMSI-1 | Variable/feature/attribute 2 |
| | | | | 40 | Add every row (Sum only) |
| | | | | 40 | |
| | | | | 60 | |
| | | | | 68 | |
| | | | | 18 | |
| | | | | 21 | |
| | | | | 21 | |
| | | 50 | | 76 | Pick the max for the Minute on the clock |
| | | 50 | | 76 | |
| | | | | 16 | |
| | | | | 13 | |
| | | | | 13 | |
| | | | | 13 | |
| | | | | 13 | |
| | | | | 0 | |
| | | | | | |

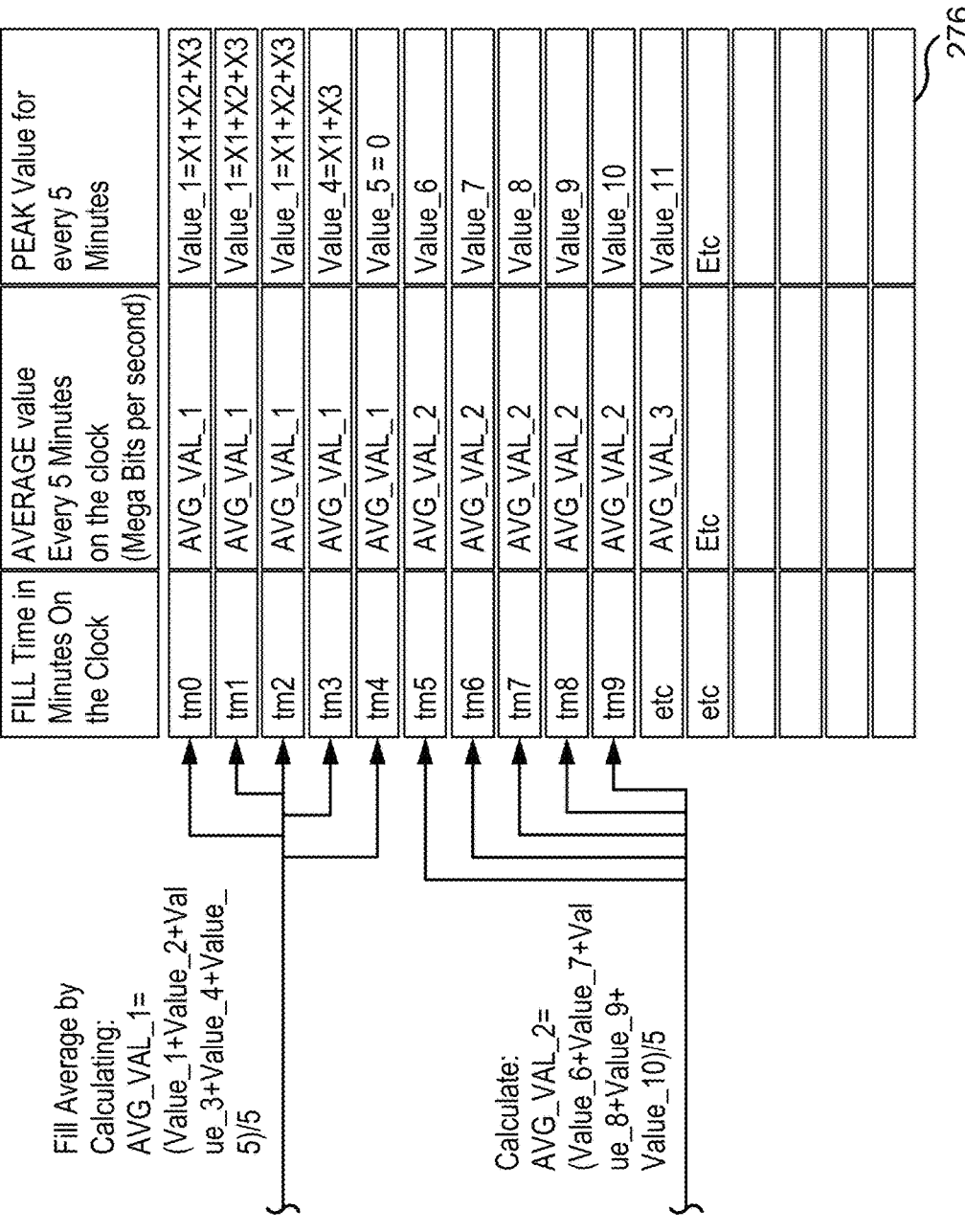

| FILL Time in Minutes On the Clock | AVERAGE value Every 5 Minutes on the clock (Mega Bits per second) | PEAK Value for every 5 Minutes |
|---|---|---|
| tm0 | AVG_VAL_1 | Value_1=X1+X2+X3 |
| tm1 | AVG_VAL_1 | Value_1=X1+X2+X3 |
| tm2 | AVG_VAL_1 | Value_1=X1+X2+X3 |
| tm3 | AVG_VAL_1 | Value_4=X1+X3 |
| tm4 | AVG_VAL_1 | Value_5 = 0 |
| tm5 | AVG_VAL_2 | Value_6 |
| tm6 | AVG_VAL_2 | Value_7 |
| tm7 | AVG_VAL_2 | Value_8 |
| tm8 | AVG_VAL_2 | Value_9 |
| tm9 | AVG_VAL_2 | Value_10 |
| etc | AVG_VAL_3 | Value_11 |
| etc | Etc | Etc |
| | | |
| | | |
| | | |

276

Fill Average by Calculating:
AVG_VAL_1= (Value_1+Value_2+Value_3+Value_4+Value_5)/5

Calculate:
AVG_VAL_2= (Value_6+Value_7+Value_8+Value_9+Value_10)/5

FIG. 2F Continued

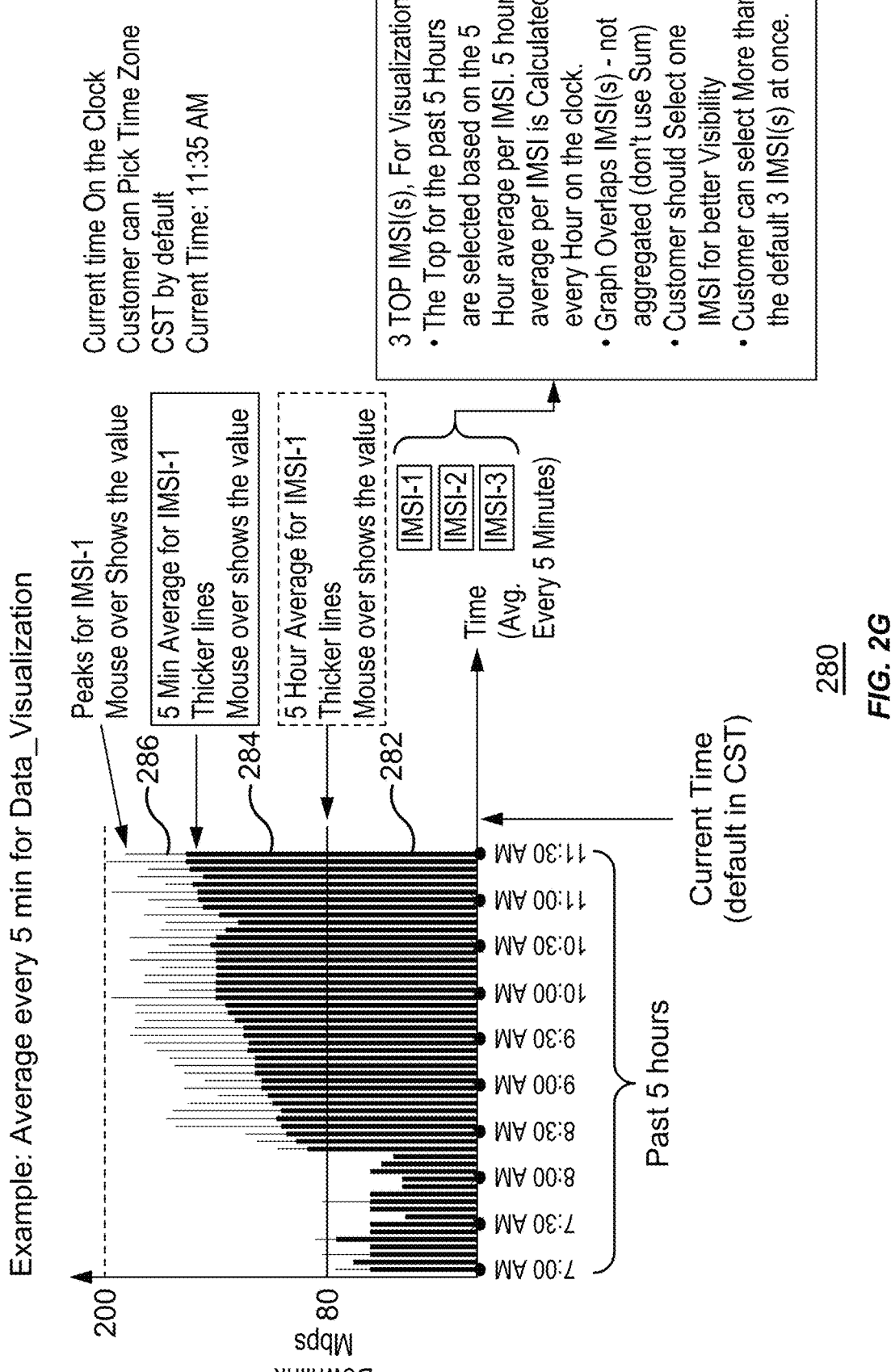

Current time On the Clock
Customer can Pick Time Zone
CST by default
Current Time: 11:35 AM 3 TOP IMSI(s), For Visualization:
• The Top for the past 5 Hours are selected based on the 5 Hour average per IMSI. 5 hours average per IMSI is Calculated every Hour on the clock.
• Graph Overlaps IMSI(s) - not aggregated (don't use Sum)
• Customer should Select one IMSI for better Visibility
• Customer can select More than the default 3 IMSI(s) at once.

Example: Average every 5 min for Data_Visualization

Peaks for IMSI-1
Mouse over Shows the value

5 Min Average for IMSI-1
Thicker lines
Mouse over shows the value

286

284

5 Hour Average for IMSI-1
Thicker lines
Mouse over shows the value

282

IMSI-1
IMSI-2
IMSI-3

Time
(Avg.
Every 5 Minutes)

Current Time
(default in CST)

Past 5 hours

7:00 AM  7:30 AM  8:00 AM  8:30 AM  9:00 AM  9:30 AM  10:00 AM  10:30 AM  11:00 AM  11:30 AM

Downlink Mbps
80
200

MONITORING BANDWIDTH UTILIZATION ON AN INTERNATIONAL MOBILE SUBSCRIBER IDENTITY (IMSI) BASIS

FIELD OF THE DISCLOSURE

The subject disclosure relates to monitoring bandwidth utilization on an International Mobile Subscriber Identity (IMSI) basis and per a network slice.

BACKGROUND

Currently, bandwidth utilization is monitored based on a volume of traffic only and carriers use the volume traffic for billing purpose. Private LTE/5G users desire the ability to monitor bandwidth utilization more in detail, such as monitoring the bandwidth utilization on an IMSI basis and/or a per network slice basis. There have been no available services that enable private or public LTE/5G users to monitor the bandwidth utilization other than or beyond the volume of traffic based monitoring. There have been no attempt to tidying various data sets relating to the bandwidth utilization on an IMSI basis in connection with a particular network slice. Such a tidying process of various data sets is complex and can be time and resource consuming.

BRIEF DESCRIPTION OF THE DRAWINGS

Reference will now be made to the accompanying drawings, which are not necessarily drawn to scale, and wherein:

FIG. 2B is a flowchart illustrating an example, non-limiting embodiment of tidying data set.

FIG. 2D depicts an example, non-limiting embodiment of data visualization.

FIG. 2G depicts further another example, non-limiting embodiment of data visualization.

DETAILED DESCRIPTION

Figure 1:
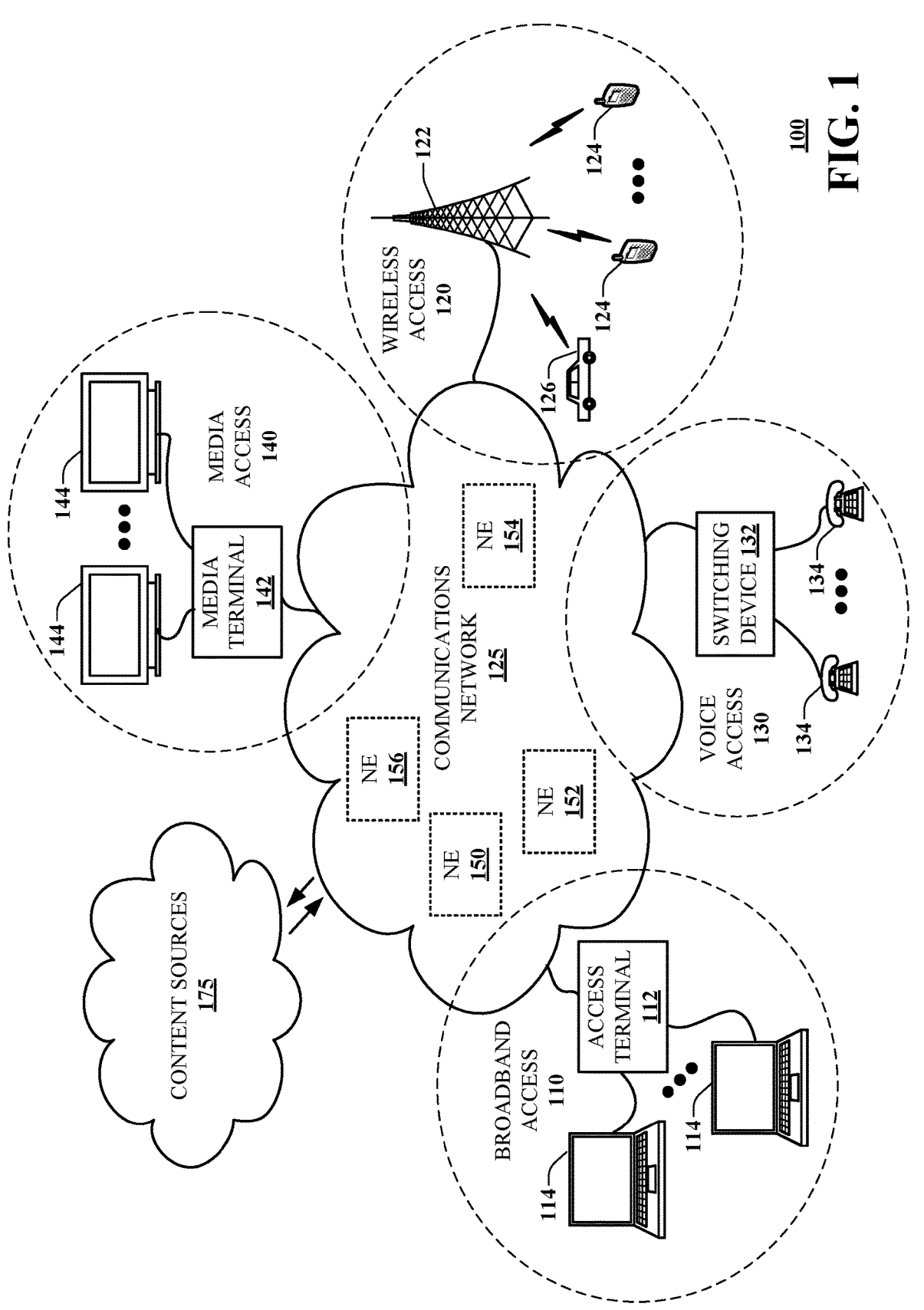
FIG. 1 is a block diagram illustrating an exemplary, non-limiting embodiment of a communications network in accordance with various aspects described herein.

The subject disclosure describes, among other things, illustrative embodiments for monitoring bandwidth utilization of a user equipment identified with International Mobile Subscriber Identity (IMSI) and operating on a particular network slice. The subject disclosure simplifies cleaning and tidying of vast amounts of communications data acquired and generates data visualization of bandwidth utilization information of every flow identifier associated with a particular IMSI with respect to predetermined time criteria, which will enable users to monitor and analyze the bandwidth utilization with respect to the particular IMSI at a granular level. Other embodiments are described in the subject disclosure.

One or more aspects of the subject disclosure include a non-transitory machine-readable medium including executable instructions that, when executed by a processing system including a processor, facilitate performance of operations. The operations include (a) receiving a first data set associated with a first International Mobile Subscriber Identifier (IMSI) from a wireless core system, wherein the first data set includes a plurality of data fields that contains one or more flow identifiers (flow IDs) associated with the first IMSI, a duration of flow for each flow ID, and traffic volume, (b) for the first IMSI and a selected network slice identifier (network slice ID), determining a capacity per each flow ID, (c) tidying the first data set by building a bandwidth matrix representing each bandwidth usage value with respect to both a selected time-stamp and the one or more flow IDs associated with the first IMSI, wherein the one or more flow IDs have one or more different durations of flow, and wherein the selected time-stamp increments from a flow start time to a flow end time by a configurable time unit, (d) repeating the operations (a) through (c) with respect to a second IMSI; and (e) generating data visualization displaying the bandwidth usage value of the first IMSI and the second IMSI.

One or more aspects of the subject disclosure include a method having steps of (i) receiving, by a processing system including a processor, a plurality of data sets related to a selected network slice identifier (ID) from a wireless core system, where the selected network slice ID is associated with a group of user equipment identified with a plurality of International Mobile Subscriber Identifiers (IMSIs), and each of the plurality of IMSIs is associated with each data set, and where each data set includes a plurality of data items indicative of a flow volume, a flow duration and one or more flow IDs, (ii) determining, by the processing system, a capacity of each flow ID based on the flow volume and the flow duration corresponding to each flow ID, wherein the flow duration corresponding to each flow ID dynamically changes, (iii) tidying, by the processing system, the plurality of data sets by: determining a first attribute including a time-stamp, wherein the time-stamp is auto-filled and auto-incremented from a flow start time to a flow end time by a configurable time unit, determining a second attribute including each flow ID associated with a corresponding IMSI and the selected network slice ID, determining a third attribute representing the determined capacity of each flow ID, and correlating the first attribute, the second attribute and the third attribute while autoincrementing the time-stamp during a time frame between the flow start time and the flow end time, and (iv) outputting data visualization representing the correlation of the first attribute, the second attribute and the third attribute with respect to each flow ID of each IMSI associated with the selected network slice ID.

One or more aspects of the subject disclosure include a device including a processing system including a processor and a memory that stores executable instructions that, when executed by the processing system, facilitate performance of operations. The operations include (i) receiving, by a processing system including a processor, a plurality of data sets related to a selected network slice identifier (ID) from a wireless core system, where the selected network slice ID is associated with a group of user equipment identified with a plurality of International Mobile Subscriber Identifiers (IM-SIs), and each of the plurality of IMSIs is associated with each data set, and where each data set includes a plurality of data items indicative of a flow volume, a flow duration and one or more flow IDs, (ii) determining, by the processing system, a capacity of each flow ID based on the flow volume and the flow duration corresponding to each flow ID, wherein the flow duration corresponding to each flow ID dynamically changes, (iii) tidying, by the processing system, the plurality of data sets by: determining a first attribute including a time-stamp, wherein the time-stamp is auto-filled and auto-incremented from a flow start time to a flow end time by a configurable time unit, determining a second attribute including each flow ID associated with a corresponding IMSI and the selected network slice ID, determining a third attribute representing the determined capacity of each flow ID, and correlating the first attribute, the second attribute and the third attribute while autoincrementing the time-stamp during a time frame between the flow start time and the flow end time, and (iv) outputting data visualization representing the correlation of the first attribute, the second attribute and the third attribute with respect to each flow ID of each IMSI associated with the selected network slice ID.

Referring now to FIG. 1, a block diagram is shown illustrating an example, non-limiting embodiment of a system 100 in accordance with various aspects described herein. For example, system 100 can facilitate in whole or in part monitoring the bandwidth utilization of user equipment on an IMSI basis. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VOIP gateway or other gateway device and/or other switching device. The telephony devices 134 can include traditional telephones (with or without a terminal adapter), VOIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 can include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
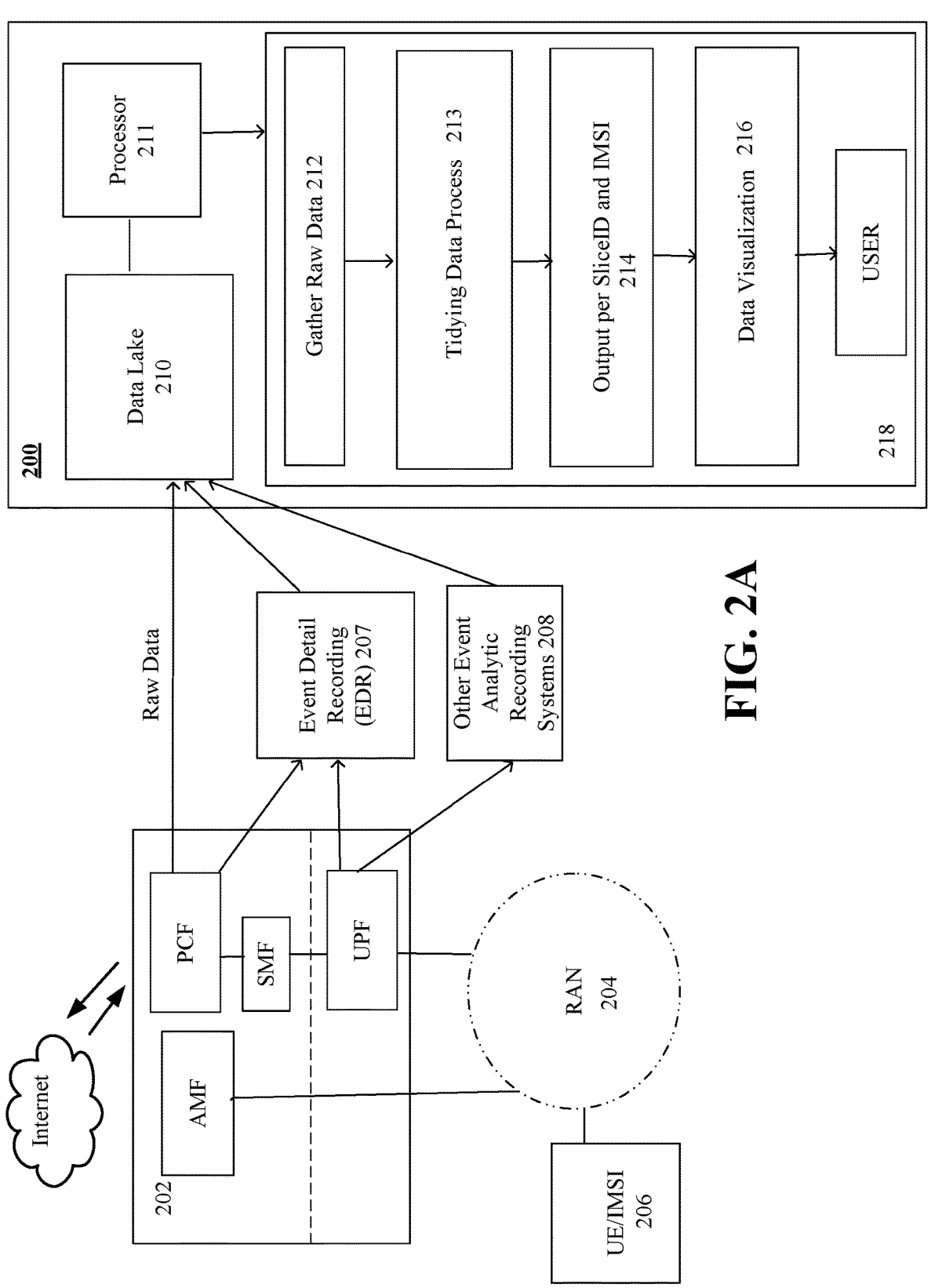
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200 functioning within the communication network of FIG. 1 in accordance with various aspects described herein. The system 200 includes a wireless core system 202, a radio access network (RAN) 204 coupled to the wireless core system 202, and user equipment 206. The wireless core system 202 includes a user plane and a control plane. Network functions included in the wireless core system 202 are described to the extent that are relevant to the present disclosure. In the control plane, AMF (Core Access and Mobility Management Function) is coupled to the RAN 204 and manages connection, mobility management, access authentication and authorization, and location services. In the control plane, UPF (User Plane Function) forwards traffic between the RAN 204 and the Internet, plus other functions. The control plane further includes the PCF (Policy Control Function) that manages policy rules, including network slicing, roaming, mobility management, etc. The PCF is one of the control plane network functions in the 5G core network and corresponds to PCRF (Policy and Charging Rules Function) which is the part of the Evolved Packet Core (EPC).

According to the relevant 5G standards, the PCF produces the PCC (Policy and Charging Control) rules according to the information collected from SMF (Session Management Function), the AMF, CHF (Charging Function), NWDAF (Network Data Analytics Function), UDR (Unified Data Repository), AF (Application Function), etc. The PCC rules are sent to the SMF. Based on the received PCC rules, the SMF will map the received PCC rules to QoS flows. The SMF determines a QoS profile including QoS parameters for the QoS flow and sends the QoS profile to 5G access network such as the RAN 204 and QoS rules to the UE. After receiving the QoS profile, the 5G access network maps the QoS flow to a suitable radio bearer and allocates radio resources. The PCF can activate, modify, and delete the PCC rules at any time.

According to the relevant 5G standards, the information provided by the AMF to the PCF includes, for example, location information, RAT (Radio Access Technology) type, service area restriction information, PLMN ID (Public Land Mobile Network Identifier), and Slice ID. The information provided by the SMF to the PCF includes, for example, SUPI (Subscription Permanent Identifier), PEI (Permanent Equipment Identifier) of the UE, IP address of the UE, etc. The information provided by the AF to the PCF includes, for example, user identification, the UE IP address, media type, bandwidth requirement, SDF (Service Data Flow) description information, and Application Service Provider information. The SDF description information includes source address, destination address, source port number, target port number, protocol type, and so on.

In 5G network, the PCF activates PCC rules for a PDU (Packet Data Unit) session, in the SMF (Session Management Function) for applications that require detection and reporting of the start or the stop event and the SMF, after receiving a report from the UPF, and reports to the PCF on the event. The PCF may make policy decisions based on the information. The PCF collects subscriber metrics with their network, usage, application, etc.

In some embodiments, the PCF collects data relating to subscriber information and traffic volume. For instance, the PCF collects data including upload volume in bytes or bibyte, download volume in bytes or bibytes and throughput in bytes per second. The PCF further collects data including a data record creation time-stamp which will define a minimum unit of time when data flow starts, for example, in seconds, milliseconds, microseconds, etc. Additionally, the PCF collects a duration of flow which is a period of the flow duration in units of time and a flow ID.

In the 5G network, user data flows from a source to a destination. Each of data packets move through a specific PDU and Data Radio Bearer (DRB). Within these pipe lines, one or more flows can be present with different level of priority, data rate, latency, etc. Each of these QoS flows is mapped to a specific item. Various type of original user data (IP packet in most case) is mapped to a different type of QoS pipe. For example, for streaming a YouTube video, the packet goes through the internet PDU and within the internet PDU, the packet should map to a particular QoS Flow No. Then the YouTube IP packet is directed (mapped) to the particular QoS Flow No.

The mapping between IP packets and QoS Pipes for downlink packets is done by the UPF. Within the UPF, there is a special algorithm for this mapping based on PDR (Packet Detection Rule). For each IP packet, the PDR checks the information of the packet defined in the packet filter configuration (Source and Destination IP address and port, Protocol ID, Type of Service etc.) and redirect the packet to a specific QoS Flow. The PDR is provided to the UPF by the SMF which interacts with the PCF.

The mapping between IP packets and QoS Pipes for uplink packets is done by UE. UE is doing the mapping based on QoS Rules defined in the relevant 5G standards.

In various embodiments, the system 200 includes a data lake 210, a processor 211, and a memory 218 storing various algorithms pertaining to processing of data sets stored in the data lake 210. As depicted in FIG. 2A, the PCF provides various raw data to the data lake 210. In addition, Event Detail Recording (EDR) and other event analytic recording systems provide raw data. The EDR systems record every event in detail and it may or may not include timestamps. In addition, the EDR detects threats in a network environment and investigate the threats in detail. Upon execution by the processor, algorithms stored in the memory 218 facilitate operations that include gathering raw data 212 from the wireless core system 202, for example, the PCF, the EDR 207 and other analytic systems 208.

In some embodiments, the system 200 resides in a data center of a service provider. Additionally, or alternatively, the system 200 may reside in a cloud, either a central cloud or an edge cloud. In other embodiments, the system 200 may reside in an environment where the data lake 210 receives the raw data from the PCF and other event analytic recording systems.

In some embodiments, the raw data gathered from the data lake 210 include throughput in bytes per second, upload volume in bytes or bibytes and converted to bytes by multiplying by 1.024, and download volume in bytes or bibytes and converted to bytes by multiplying by 1.024. In some embodiments, traffic volume, i.e., throughput, upload volume, and download volume, can be bits per second (bps), scaled to kilobits per second (Kbps), megabits per second (Mbps), gigabits per second (Gbps), etc. The raw data further include data record creation time-stamps which will define a minimum unit of time when data flow starts. In various embodiments, the data record creation time-stamps can be in seconds, milliseconds, microseconds, etc. The raw data also include a duration of a flow (i.e., a period of flow duration in units of time), and a flow ID. As discussed above, a single UE can have multiple flow IDs at once. The multiple flow IDs may have the identical or different durations of a flow. The raw data further include source IP address and destination IP address. In some embodiments, the source IP address and the destination IP address can be in the form of IPv4 by way of example.

In various embodiments, the raw data further includes a network slice ID. A network slice is used to provide a different service to a different user. According to 3GGP standard, a network slice is a generalization of the QoS Class Index (QCI) and the 3GPP specifies Standardized Slice Type (SST) values such as mobile broadband (SST1), Ultra-Reliable Low Latency Communications (SST2), Massive IoT (SST3), etc. Multiple slices can be defined for each SST to provide further different services to different subscribers based on priority.

In various embodiments, the gathering the raw data 212 includes gathering data with respect to and associated with an IMSI. IMSI is a number that uniquely identifies a user of a cellular network. For instance, IMSI includes mobile country code (MCC), mobile network code (MNC), and mobile subscription identification number (MSIN). IMSIs may be different from an identifier for a physical SIM card or a virtual SIM card (e.g., an eSIM). In addition, the gathering the raw data 212 further includes gathering data with respect to a network slice ID.

For each IMSI and each network slice, the gathered raw data are correlated and processed with respect to a configurable time period and flow IDs in order to determine and monitor bandwidth utilization. In various embodiments, this process corresponds to a tidying data process 213. The configurable time period can define a time frame that bandwidth utilization of each flow ID may be monitored such as every minute, every five minutes, or else. The tidying data process 213 is quite complex and extensive because the process 213 involves a very large number of different data. A single IMSI can have multiple flow IDs and each flow ID may have a different duration of flow. For instance, downlink packets may include using various internet services, video stream services, voice, video, etc., which result in different QoS flows having different flow IDs and different durations. In some embodiments, flow durations of different flow IDs may dynamically change or vary. The tidying data process 213 includes deconstructing different data, calculating necessary data items, building a matrix based on time stamps and flow IDs, and scaling to encompass all of IMSIs pertaining to a particular network slice. The tidying data process 213 will be discussed further in detail in conjunction with FIGS. 2B through 2G.

As a result of the tidying data process 213, bandwidth utilization is output in association with the network slice ID and the IMSI (214 in FIG. 2A). The output can be visualized in many different forms based on selection and customization by users (216 in FIG. 2A). FIGS. 2D and 2F-2G depict examples of the data visualization, which will be described further in detail. The data visualization is presented to a user who can monitor detailed bandwidth utilization in association with the IMSI and the network slice ID. For instance, a user can be a system operator or administrator in charge of networks including a large number of users or customers, such as enterprise networks, school networks, etc. where many devices are connected and experience different usage patterns and resulting network outages or surges. Based on the detailed bandwidth utilization, the user can monitor usage patterns and manage and control efficient use of bandwidth. In some cases, the user can also determine and identify a few devices which predominantly use the bandwidth and take necessary steps to prevent network outages or surges. Additionally or alternatively, the user has access to a comprehensive analysis of the bandwidth utilization by relevant devices and can be equipped with relevant information to control, manage and upkeep the available bandwidth utilization.

Figure 2C:
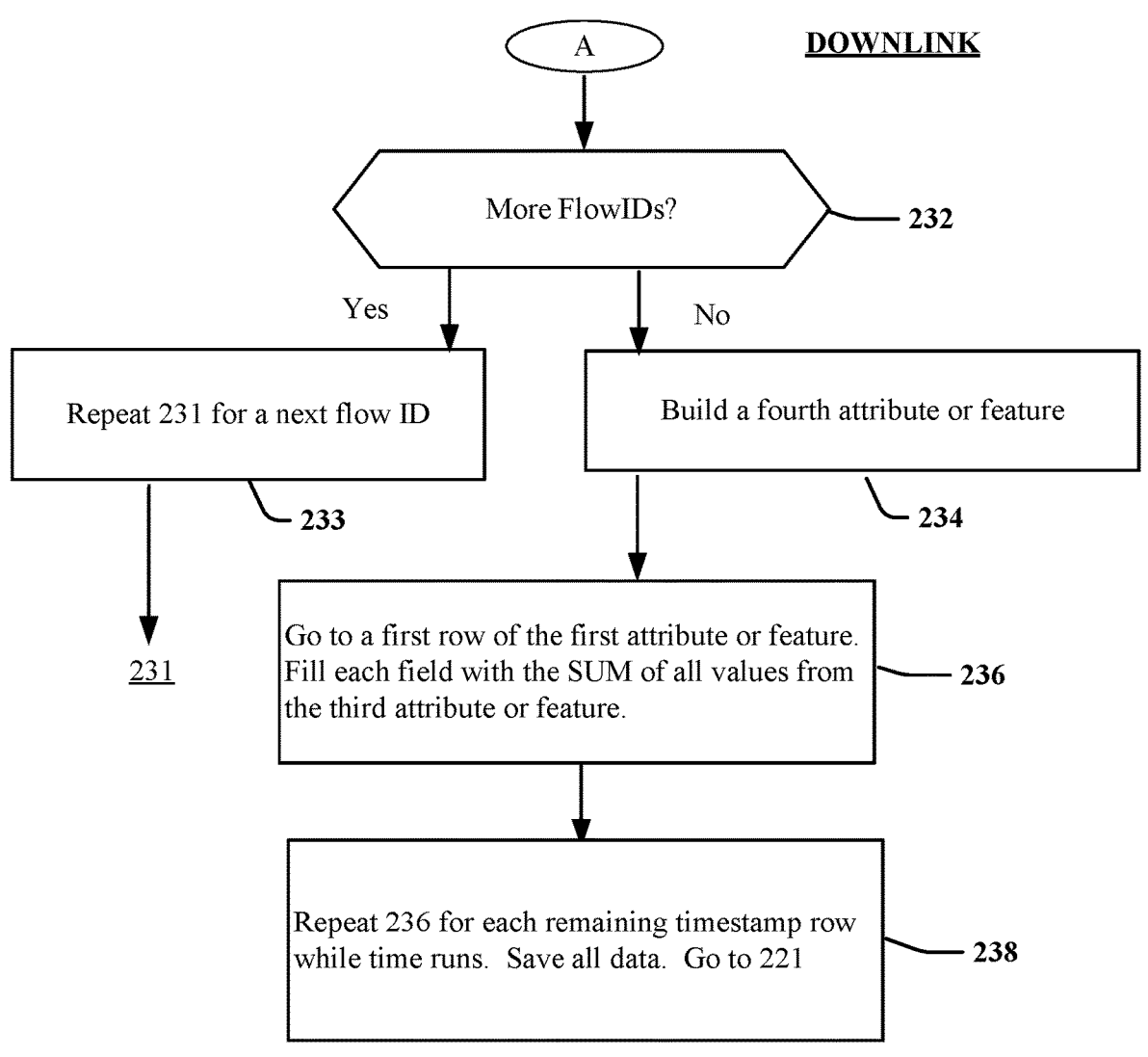
FIG. 2C is a flowchart continued from the flowchart of FIG. 2B.

FIGS. 2B and 2C are flowcharts which depict a non-limiting example of a method 220 for generating downlink, uplink and throughput bandwidth utilization output. As described above in connection with FIG. 2A, raw data is obtained from the wireless core and other data providing systems (Step 221). In some embodiments, the raw data include various data relating to traffic volumes, a network slice ID, a subscriber identity, time-stamps relating to traffic volumes, etc. For instance, the traffic volume data include upload data volume, download data volume, and throughput data volume as a basic set of volume. As another example, each IMSI is associated with one or more flow IDs. For instance, various applications can be running on a device having a selected IMSI. Various applications can be associated with different flow IDs depending on different types of data such as IP data, video, voice, etc. In some embodiments, flow IDs may operate as session IDs.

The raw data gathered is processed and subject to a tidying process for each IMSI and each network slice (Step 222). The volume data can be received in bytes or bibytes. If the volume data is received in bibytes (Step 223), the volume is multiplied by 1.024 or its scale value in kibibytes, etc. (Step 224). The volume data is associated with a start time and an end time. The start time can be converted to human readable time, ddmmyy-hh:mm:ss:ms:us, if and as needed, and the results are saved (Step 225). Likewise, the end time can be converted to human readable time, ddmmyy-hh:mm:ss:us and the results are saved (Step 226). For each flow ID, a downlink (DL) flow using the volume data and a duration of flow is calculated by dividing the corresponding volume by the duration of flow (Step 227). The results are saved and the same scaled units are used for all calculations (Step 227). In some embodiments, the steps 225, 226 and 227 can be performed in parallel. Additionally, or alternatively, the steps 225, 226 and 242 (for uplink flow), and the steps 225, 226 and 244 (for throughput flow), can be performed in parallel.

In various embodiments, the tidying data process includes building a bandwidth matrix representing a first attribute or feature and a second attribute or feature (Steps 228, 229). In some embodiments, the first attribute or feature includes a time-stamp that is associated with a flow volume. The time-stamp is a user configurable unit of time that monitors the bandwidth utilization. For example, the time-stamp can be set as 1 second, 1 microsecond, 1 minute, etc. based on various parameters. In some embodiments, the time-stamp can be set in light of network environments, historical usage patterns, business needs, system operation parameters, equipment related parameters, etc. The time-stamp can be auto-filled and each value can be auto-incremented (Step 228). In some embodiments, the time-stamp increments using the smallest timestamp unit available or agreed to use for the operations (Step 228). Additionally, a second attribute or feature includes flow IDs which can be associated with one or more IMSIs (Step 229). A third attribute or feature includes flows correlated to each time-stamp and each flow ID (Step 231). In the tidying data process, flow consumed by each flow ID at a particular time-stamp is determined and recorded.

Referring to FIG. 2C, the tidying data process is repeated with respect to more flow IDs associated with the particular IMSI (Step 232). With respect to a next flow ID, the Step 231 is repeated (Step 233). If there is no more flow ID, a fourth attribute or feature is built (Step 234). The fourth attribute or feature is a sum of all values from the third attribute or feature (Step 236). With respect to each time-stamp in each row, the sum of all value is sequentially determined while time runs (Step 238). All of data is saved (Step 221) and the process goes back to Step 221.

While for purposes of simplicity of explanation, the respective processes are shown and described as a series of blocks in FIGS. 2A and 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring back to FIG. 2A, after the tidying data process 213 is completed, output per slice ID and per IMSI is generated 214. Based on such output, data visualization 216 can be generated on a user interface based on various parameters. FIG. 2D depicts a non-limiting example 250 of the data visualization 216. With respect to a particular IMSI, downlink volume is shown in Mbps. Although now shown, this particular IMSI is further associated with a particular network slice ID which defines selected QoS requirements and priority. Each column shows a plurality of flow IDs associated with this particular IMSI. Each flow ID is associated with a flow duration, such as DUR-0, DUR-2, DUR-4, DUR-5, DUR 7, DUR 9 and DUR-11 which can be identical or different from one another. The flow durations dynamically change or vary.

Figure 2E:
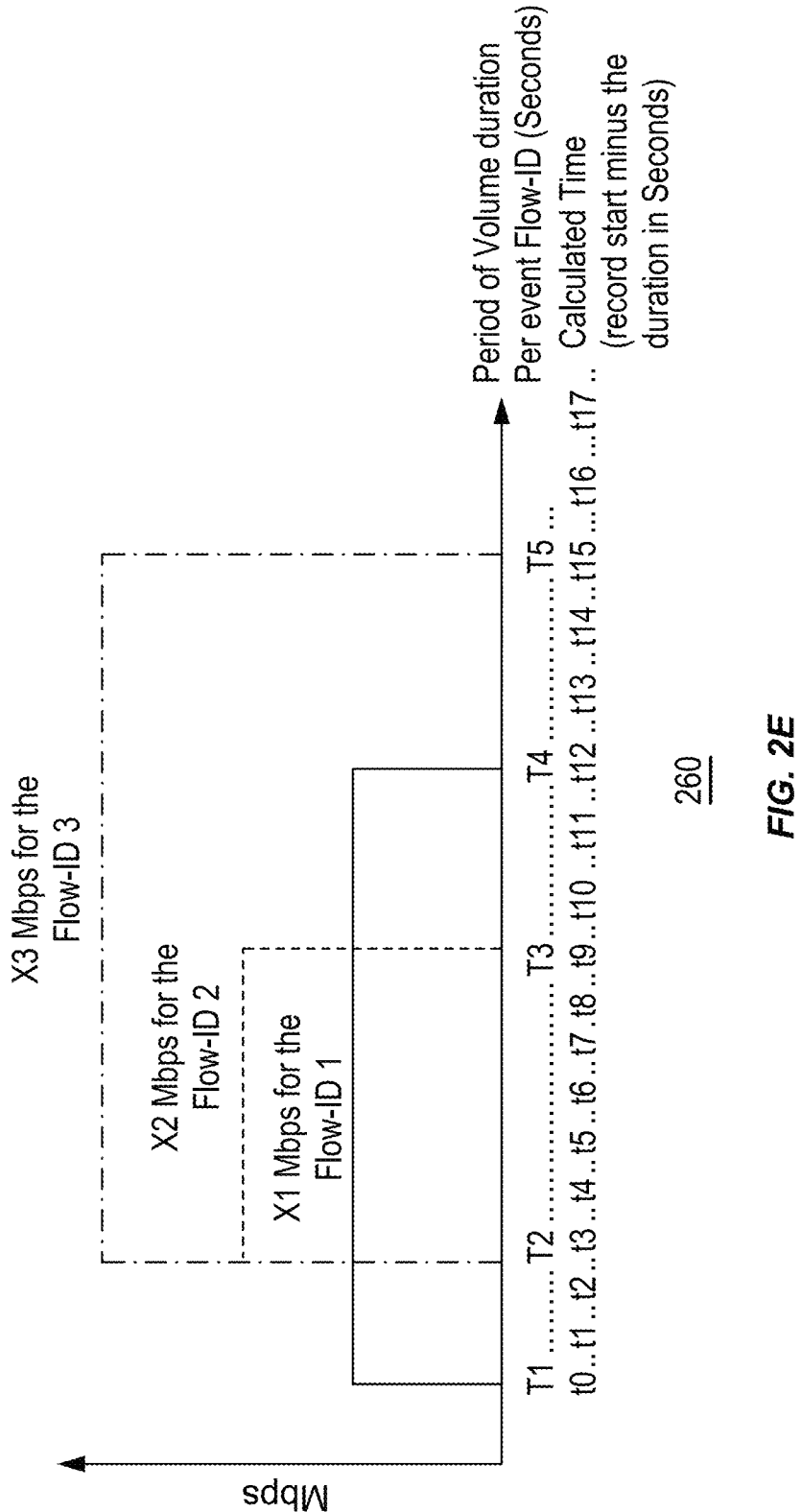
FIG. 2E depicts an example, non-limiting embodiment of flow IDs and flow durations thereof.
Figure 2F:
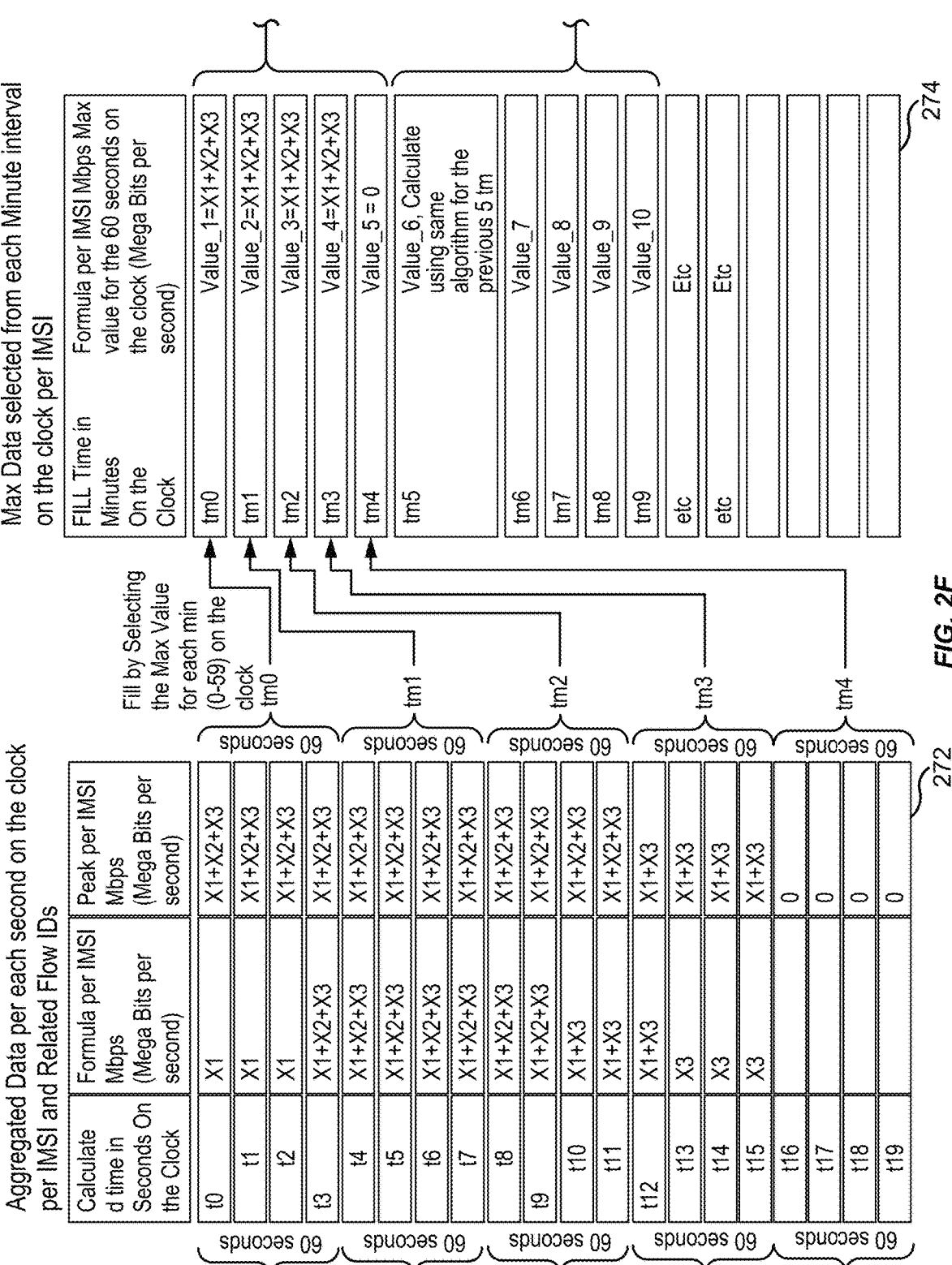
FIG. 2F depicts another example, non-limiting embodiment of data visualization.

In some embodiments, the flow duration of each flow ID may overlap at least partially. FIG. 2E depicts a non-limiting example of the flow durations that overlap 260. FIG. 2E further depicts a non-limiting example of different flow IDs and different flow durations. By way of example only, FIG. 2E depicts flow-ID 1, flow-ID 2 and flow-ID 3. With respect to times along x-axis, a first flow duration for Flow-ID1 spans from T1 to T4, a second flow duration for Flow-ID2 spans from T2 to T3 which completely overlaps with the first flow duration. For a third flow duration of Flow-ID3, it spans from T2 to T5 which also overlaps with the second flow duration and partially overlaps with the first flow duration. In other words, the flow-ID 1 has a start time T1 and an end time T4 and a flow duration of the flow-ID 1 equals to T4-T1. The flow-ID 2 starts from T2 and ends at T3. The flow-ID 3 runs from T2 and T5. In some embodiments, the flow durations of Flow-ID1, Flow-ID2 and Flow-ID3 are different from one another. The flow durations of the flow-ID 1 through the flow-ID 3 partially overlap. As depicted in FIG. 2E, total bandwidth utilization reaches a peak between T2 and T3.

Assuming that Flow-ID1, Flow-ID2 and Flow-ID3 are associated with a particular IMSI and a particular network slice, bandwidth utilization can be monitored at a designated time frame between a start time of flow (t0) and an end time of flow (t15). As depicted in FIG. 2E, the bandwidth utilization of the flow-ID 1, the flow-ID 2, and the flow-ID 3 is monitored within a predetermined time duration (i.e., t0~t15). In some embodiments, the predetermined time duration is time-stamped starting from t0 and incremented to t15 by a time unit. For example, the time unit can be 1 second and the time duration is 15 seconds. As another example, the time unit can be a smallest fraction of time available and compatible with the network environments.

As shown in FIG. 2G, peak per IMSI can be determined at each time stamp from t0 to t15. Using this example, five minutes take between t0 and t15, and every 5 minutes, average data can be shown using data per minute. Every minute a peak data and not an average can be determined.

Referring back to FIG. 2D, a row following the start time is filled in with the third attribute or feature. For example, the third attribute or feature is the calculated flow of each flow ID at a particular time stamp. Using the example depicted in FIG. 2D, the same or different flows fill in each cell defined by rows representing different time stamps and columns representing different flow IDs. This continues until the designated time (e.g., 15 seconds) run. In some embodiments, the designated time can vary based on a user's request, a user input, a default setting, network operation parameters, etc. A column 252 next to Flow-ID-9, is used to show total flow of all of flow IDs at each particular time stamp which enables a max usage time stamp to be determined. This total flow corresponds to the bandwidth utilized at that specific timestamp and can be referred to as Real Bandwidth Value for that specific timestamp for the particular IMSI and the particular network slice ID under consideration.

In FIG. 2D, nine flow IDs are depicted for the purpose of explanation but in practical applications, a number of flow IDs can be a large number, e.g., more than 1000 flow IDs. Additionally, or alternatively, flow durations of each flow ID can vary. By way of example only, there may be 100 or more flow duration values. FIG. 2D depicts a relatively smaller data set for the purpose of description only, but actual data sets can encompass a very large set of data encompassing more than 1000 flow IDs, some or more of which have different flow durations. The tidying dataset process can be scaled to address the extremely large data sets and build a matrix which shows different bandwidth usage at a small time fraction which increments between a flow start time and a flow end time. In addition, the different bandwidth usage is associated with a particular IMSI and a particular network slice ID. Additionally, monitoring of the different bandwidth usage can be scaled to encompass all of available IMSIs and their associated flow IDs in the particular network slice ID.

In various embodiments, a single IMSI can have multiple flow IDs as multiple different applications can be run. Flow ID numbers can be dynamic and will not be a fixed number of flows. Flow IDs may be added at any subsequent time. The same applies for the network slice ID. In other words, there are numerous network slice IDs which can dynamically change. The tidying dataset process manages to cover network slice IDs, IMSIs associated with the network slice IDs, and flow IDs further associated with all of the IMSIs and having different flow durations.

FIGS. 2B through 2E described above are related to downlink data. The same process depicted in FIG. 2B is performed with respect to uplink data and throughput data. Traffic volume for the uplink data is obtained in the obtaining raw data process 221. Referring back to FIG. 2B at Step 227, instead of calculating the downlink flow, an uplink flow is calculated for each flow ID (Step 242). Likewise, instead of calculating the downlink flow, a throughput flow is calculated for each flow ID (Step 244). The sum of the downlink flow and the uplink flow should be equal to the throughput flow, which enables verification of the flow data.

In various embodiments, the bandwidth utilization can be measured in bits per seconds, and represented on any scale like kilobits per second, Megabits per second (Mbps), Gigabits per second (Gbps), Terabits per second, etc.

In various embodiments, outside of the flow start time and the flow end time, for each flow ID, zero is added to all the time-stamps. This can simplify the tidying data process and reduce processing load and resources.

FIG. 2F depicts tables showing the outcome 270 of the tidying data process according to various embodiments of the present disclosure. The first table 272 shows a non-limiting example of aggregated data per second on the clock associated with per IMSI and related flow IDs, i.e., Flow-ID1, Flow-ID2 and Flow-ID3 by using the example of FIG. 2E. The example of FIG. 2E and the visualization of FIG. 2F are for illustration purpose only and the present disclosure is not limited thereto. The present disclosure is able to encompass tying vast amounts of datasets and present corresponding data visualization at a granular level. X1, X2 and X3 correspond to flow of Flow-ID1, Flow-ID2 and Flow-ID3, respectively. With respect to every time-stamp, to through t15, the determined capacity of flow can be presented in various data visualization forms and manners, as depicted in FIG. 2F. By way of example only, five minutes is configured to be set such that a max value for each minute (0~59 seconds) on the clock is filled in the first table 272. As depicted in FIG. 2E, the sum of bandwidth usage and the peak value at every time stamp are shown in the table 272. The max value is checked for every minute for a total of 5 minutes, as shown in the second table 274. From the values shown in the table 274, average values are calculated by dividing the total bandwidth usage by five (5) corresponding to 5 minutes, as shown in the third table 276.

FIG. 2F illustrates non-limiting examples using three flow IDs and three flow capacity as depicted in FIG. 2E for convenience and simplicity of description and the present disclosure is not limited to the examples as shown in FIG. 2F. The data visualization involving a large number of user equipment identified with a large number of IMSIs and further associated flow IDs with different flow durations may involve extensive and comprehensive data tidying process and data visualization at a granular level. Users or customers may customize forms, substance and manners of the data visualization based on their needs. Additionally, users or customers may customize or make specific requests with respect to the scope of data subject to and relevant to the extensive and comprehensive data tidying process.

FIG. 2G depicts non-limiting examples of data visualization 280 representing average bandwidth usage at every 5 minutes, every 5 hours and peak time for data visualization presented to a user. The user can select past 5 hours from the current time (11:35 am CST as a default) and review the bandwidth utilization for the past 5 hours 282, 5 minutes average 284, and the peak time 286. For example, the user can hover a mouse over 282, 284 or 286 to see the bandwidth usage values. Although FIG. 2G depicts the data visualization for the one IMSI, multiple IMSIs can be shown based on settings. Different IMSIs can be visualized with different color coding. For instance, three different IMSIs such as IMSI-1, IMSI-2 and IMSI-3 can be shown for visualization. FIG. 2G illustrates the non-limiting example for convenience and simplicity of description and the present disclosure is not limited to the examples as shown in FIG. 2G.

Figure 3:
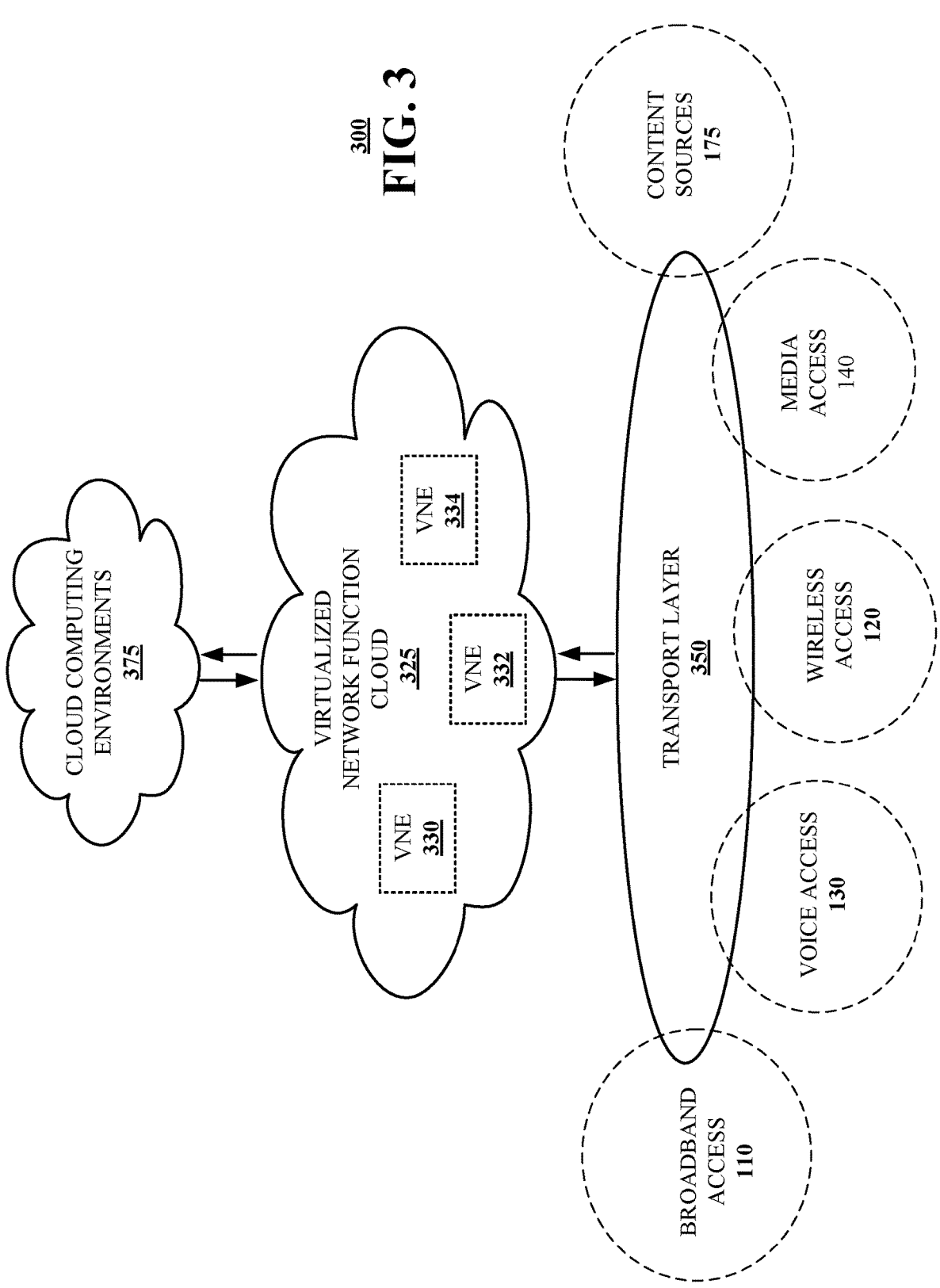
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, and method 230 presented in FIGS. 1, 2A, 2B, 2C, and 3. For example, virtualized communication network 300 can facilitate in whole or in part monitoring the bandwidth utilization of user equipment on an IMSI basis.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs or containerized functions or applications, such as functions and applications may also be running on a Bare metal server. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
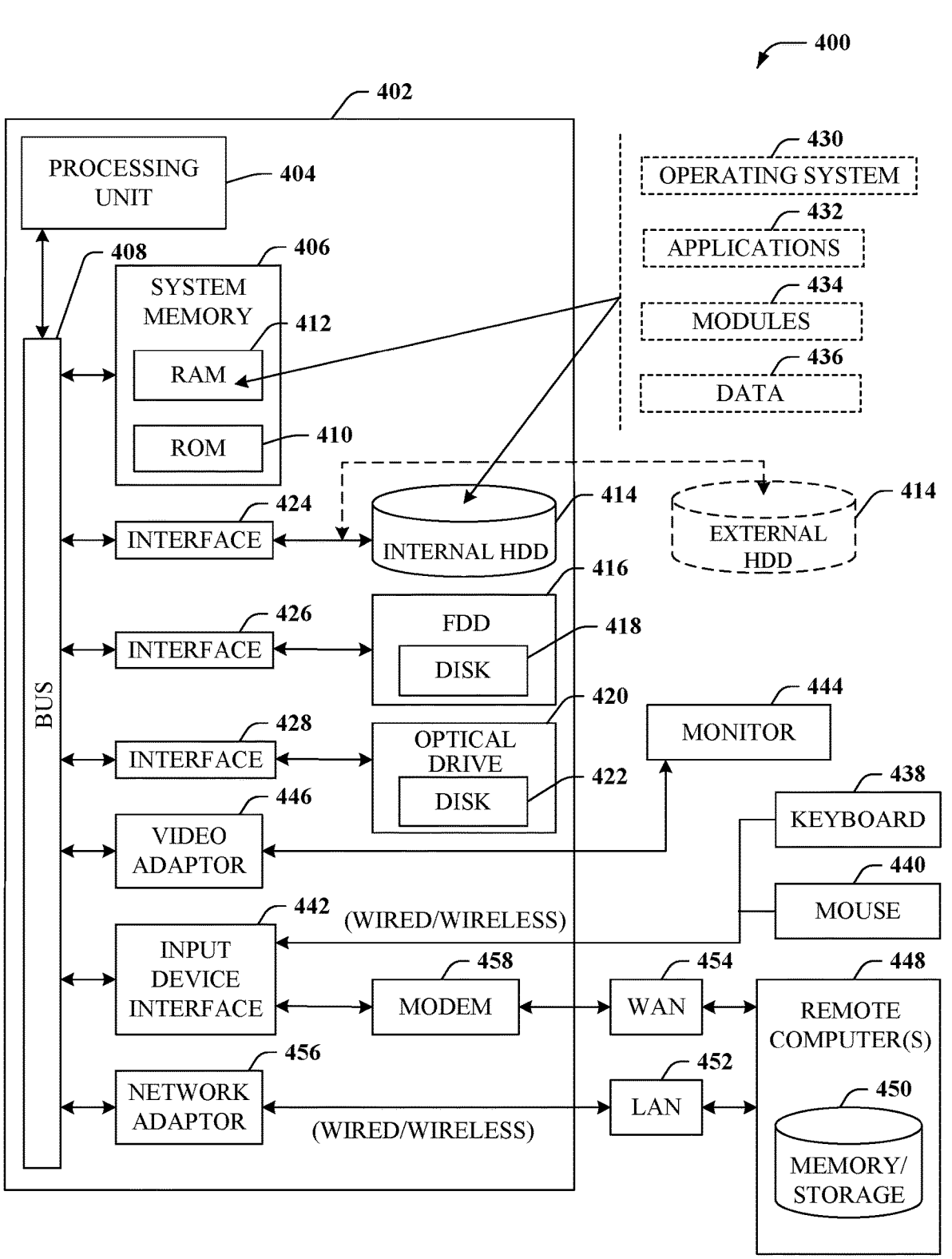
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part monitoring the bandwidth utilization of user equipment on an IMSI basis.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/ or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) or a solid state disk (SSD) or any type of storage 414 (e.g., EIDE, SATA), which internal HDD 414 can also be configured for external use in a suitable chassis (not shown), can use any type of on-premise or remote storage as JBOD (Just a Bunch of Disks), NAS (Networks Attached Storage), SAN (Storage Area Network), Cloud Storage (not shown) magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
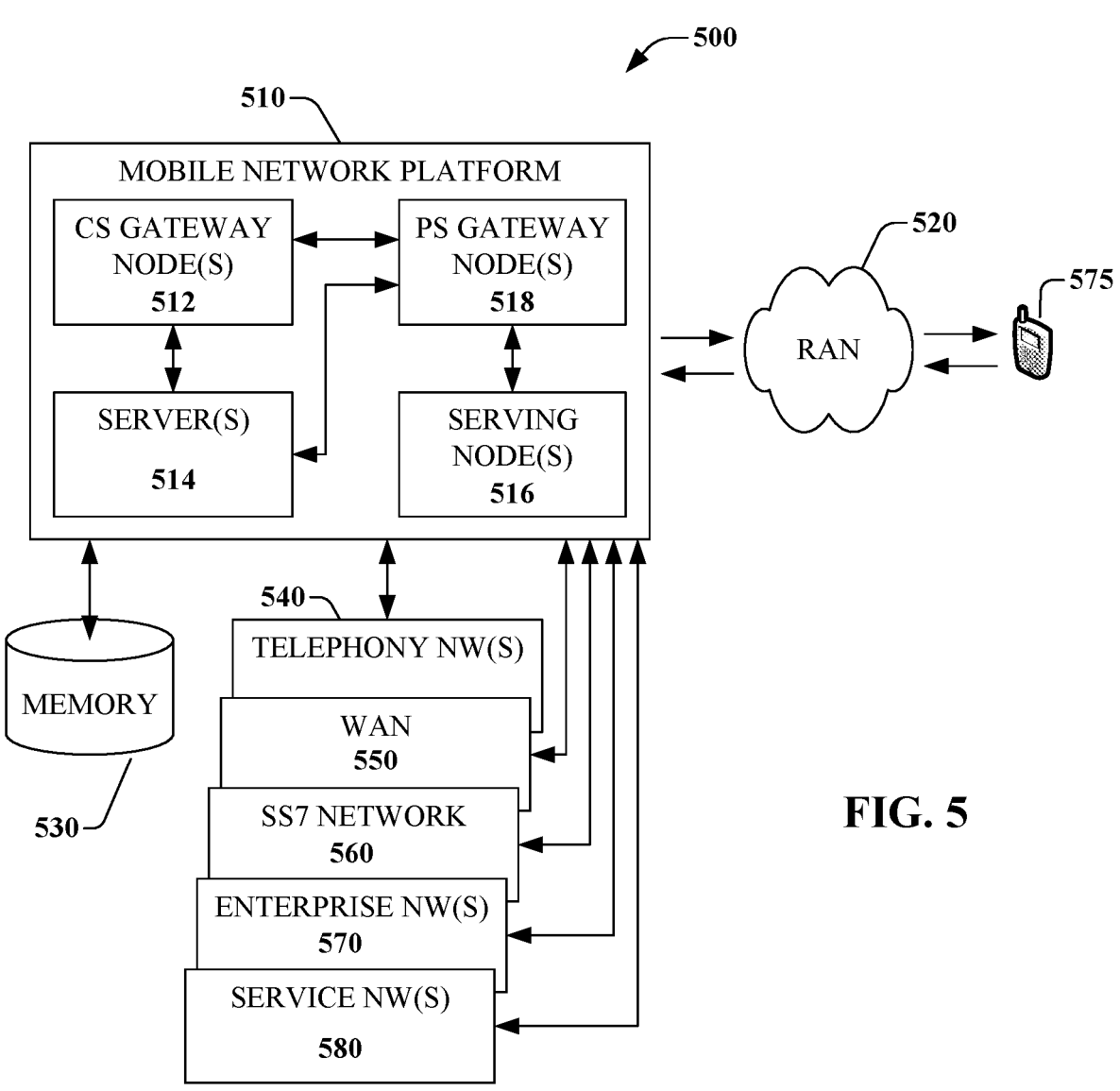
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part monitoring the bandwidth utilization of user equipment on an IMSI basis. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology (ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
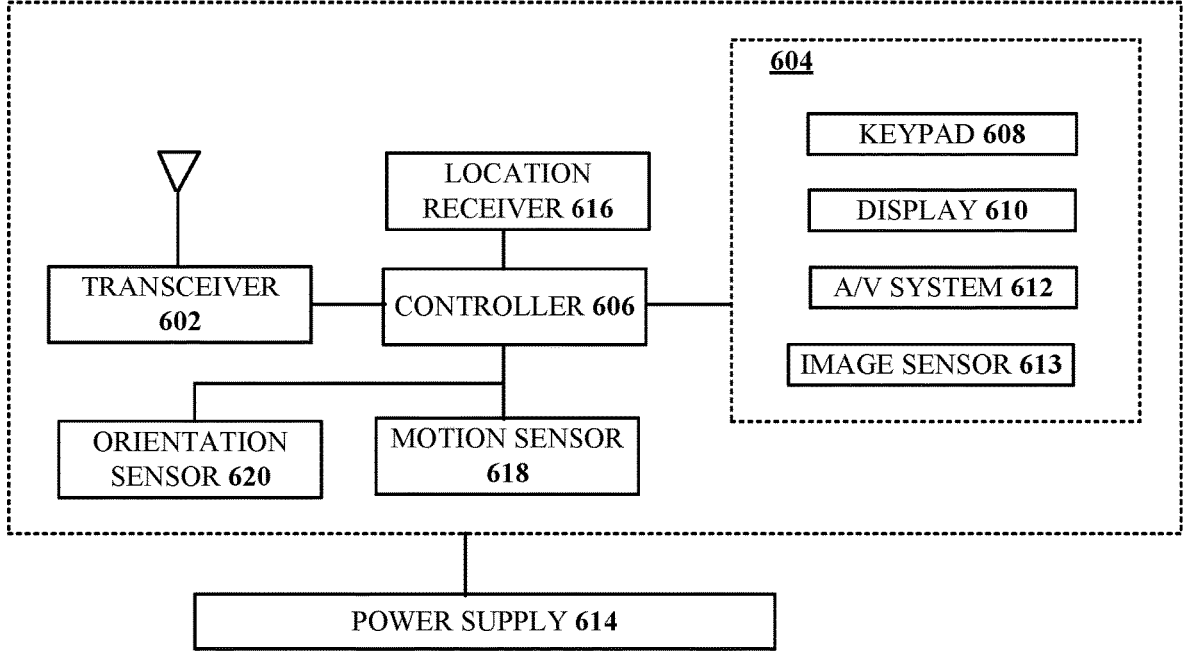
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part monitoring the bandwidth utilization of user equipment on an IMSI basis.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human car) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)=$ confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A non-transitory machine-readable medium, comprising executable instructions that, when executed by a processing system including a processor, facilitate performance of operations, the operations comprising:

receiving a first data set associated with a first International Mobile Subscriber Identifier (IMSI) from a wireless core system, wherein the first data set includes a plurality of data fields that contains one or more flow identifiers (flow IDs) associated with the first IMSI, a duration of flow for each flow ID, and traffic volume;

for the first IMSI and a selected network slice identifier (network slice ID), determining a capacity per each flow ID;

tidying the first data set by building a bandwidth matrix representing each bandwidth usage value with respect to a selected time-stamp and the one or more flow IDs associated with the first IMSI, wherein the one or more flow IDs have one or more different durations of flow, and wherein the selected time-stamp increments from a flow start time to a flow end time by a configurable time unit;

repeating the receiving, determining and tidying with respect to a second data set associated with a second IMSI; and generating data visualization displaying the bandwidth usage value of the first IMSI and the second IMSI.

2. The non-transitory machine-readable medium of claim 1, wherein the plurality of data fields contains a throughput in bytes per second, an upload volume in bytes per second or bibytes, and a download volume in bytes per second or bibytes.

3. The non-transitory machine-readable medium of claim 2, wherein the determining the capacity per each flow ID further comprises determining the capacity per each flow ID with respect to an uplink traffic, a downlink traffic and a throughput traffic, respectively, based on the traffic volume of each flow ID and the duration of flow for each flow ID.

4. The non-transitory machine-readable medium of claim 3, wherein the determining the capacity per each flow ID further comprises dividing the traffic volume of each flow ID by the duration of flow for each flow ID.

5. The non-transitory machine-readable medium of claim 1, wherein generating the data visualization further comprises upon determination of no remaining IMSI associated with the selected network slice ID, generating the data visualization displaying the bandwidth usage value per the first IMSI and per the second IMSI.

6. The non-transitory machine-readable medium of claim 1, wherein generating the data visualization further comprises generating the data visualization displaying the bandwidth usage value per each flow ID associated with the first IMSI and displaying the bandwidth usage value per each flow ID associated with the second IMSI.

7. The non-transitory machine-readable medium of claim 1, wherein the configurable time unit is set as a smallest fraction of time that is available with the first data set and the wireless core system.

8. The non-transitory machine-readable medium of claim 1, wherein the operations further comprise converting the flow start time and the flow end time to a human readable form.

26

9. A method, comprising:

receiving, by a processing system including a processor, a plurality of data sets related to a selected network slice identifier (ID) from a wireless core system, wherein the selected network slice ID is associated with a group of user equipment identified with a plurality of International Mobile Subscriber Identifiers (IMSIs), and each of the plurality of IMSIs is associated with each data set, and wherein each data set includes a plurality of data items indicative of a flow volume, a flow duration and one or more flow IDs;

determining, by the processing system, a capacity of each flow ID based on the flow volume and the flow duration corresponding to each flow ID, wherein the flow duration corresponding to each flow ID dynamically changes;

tidying, by the processing system, the plurality of data sets by:

determining a first attribute including a time-stamp, wherein the time-stamp is auto-filled and auto-incremented from a flow start time to a flow end time by a configurable time unit;

determining a second attribute including each flow ID associated with a corresponding IMSI and the selected network slice ID;

determining a third attribute representing the determined capacity of each flow ID; and correlating the first attribute, the second attribute and the third attribute while autoincrementing the time-stamp during a time frame between the flow start time and the flow end time; and outputting data visualization representing the correlation of the first attribute, the second attribute and the third attribute with respect to each flow ID of each IMSI associated with the selected network slice ID.

10. The method of claim 9, wherein each of the plurality of IMSIs is associated with a first number of flow IDs and the first number of flow IDs corresponds to a second number of flow durations, the first number of flow IDs being greater than or equal to the second number of flow durations.

11. The method of claim 9, wherein the determining, by the processing system, the capacity of each flow ID further comprises:

calculating and saving, for each flow ID, a downlink flow by dividing the flow volume corresponding to a download volume by the flow duration; and calculating and saving, for each flow ID, an uplink flow by dividing the flow volume corresponding to an upload volume by the flow duration.

12. The method of claim 9, further comprising detecting, by the processing system, a plurality of actual flow start times associated with the one or more flow IDs and different from the flow start time, wherein the outputting the data visualization further comprises displaying the plurality of actual flow start times along with each flow ID and the flow duration corresponding to each flow ID.

13. The method of claim 9, wherein the outputting data visualization further comprises generating the data visualization displaying first bandwidth usage information for each flow ID per each IMSI and displaying remaining bandwidth usage information with respect to remaining IMSIs in connection with the selected network slice ID.

14. The method of claim 9, wherein the outputting data visualization further comprises generating the data visualization displaying first bandwidth usage information for each flow ID per each IMSI, with respect to the auto-incremented time-stamp by the configurable time unit determined based on a user input.

15. A device, comprising:

a processing system including a processor; and a memory that stores executable instructions that, when executed by the processing system, facilitate performance of operations, the operations comprising:

receiving, by a processing system including a processor, a plurality of data sets related to a selected network slice identifier (ID) from a wireless core system, wherein the selected network slice ID is associated with a group of user equipment identified with a plurality of International Mobile Subscriber Identifiers (IMSIs), and each of the plurality of IMSIs is associated with each data set, and wherein each data set includes a plurality of data items indicative of a flow volume, a flow duration and one or more flow IDs;

determining, by the processing system, a capacity of each flow ID based on the flow volume and the flow duration corresponding to each flow ID, wherein the flow duration corresponding to each flow ID dynamically varies and wherein the one or more flow IDs have one or more different durations of flow;

tidying, by the processing system, the plurality of data sets by:

determining a first attribute including a time-stamp, wherein the time-stamp is auto-filled and auto-incremented from a flow start time to a flow end time by a configurable time unit;

determining a second attribute including each flow ID associated with a corresponding IMSI and the selected network slice ID;

determining a third attribute representing the determined capacity of each flow ID; and correlating the first attribute, the second attribute and the third attribute while autoincrementing the time-stamp during a time frame between the flow start time and the flow end time; and outputting data visualization representing the correlation of the first attribute, the second attribute and the third attribute with respect to each flow ID of each IMSI associated with the selected network slice ID.

16. The device of claim 15, wherein each of the plurality of IMSIs is associated with a first number of flow IDs and the first number of flow IDs corresponds to a second number of flow durations, the first number of flow IDs being greater than or equal to the second number of flow durations.

17. The device of claim 15, wherein the determining, by the processing system, the capacity of each flow ID further comprises:

calculating and saving, for each flow ID, a downlink flow by dividing the flow volume corresponding to a download volume by the flow duration; and calculating and saving, for each flow ID, an uplink flow by dividing the flow volume corresponding to an upload volume by the flow duration.

18. The device of claim 15, wherein the operations further comprise detecting, by the processing system, a plurality of actual flow start times associated with the one or more flow IDs and deviated from the flow start time, wherein the outputting the data visualization further comprises displaying the plurality of actual flow start times along with each flow ID and the flow duration corresponding to each flow ID.

19. The device of claim 15, wherein the outputting data visualization further comprises generating the data visualization that displays first bandwidth usage information for each flow ID per each IMSI and displays bandwidth usage information with respect to remaining IMSIs in connection with the selected network slice ID.

20. The device of claim 15, wherein the outputting data visualization further comprises generating the data visualization that displays first bandwidth usage information for each flow ID per each IMSI, with respect to the auto-incremented time-stamp by the configurable time unit determined based on a user input.

* * * * *